United States Patent [19]

Weiant et al.

[11] 3,967,429

[45] July 6, 1976

[54] METHOD OF GROUTING USING SPECIFIC MORTAR COMPOSITION

[75] Inventors: David S. Weiant, Morrestown, N.J.; Frank E. Bernett, Yardley, Pa.; William R. Velivis, Trenton, N.J.

[73] Assignee: Tile Council of America, Inc., Princeton, N.J.

[22] Filed: Sept. 4, 1974

[21] Appl. No.: 503,153

Related U.S. Application Data

[60] Division of Ser. No. 304,727, Nov. 8, 1972, which is a continuation of Ser. No. 105,109, Jan. 8, 1971, abandoned.

[52] U.S. Cl. .................................. 52/744; 52/747
[51] Int. Cl.² ........................................ E04G 21/00
[58] Field of Search ............ 52/744, 315, 388, 389; 260/29.75, 29.6 WB, 29.6 E, 29.6 ME; 264/261

[56] References Cited
UNITED STATES PATENTS

| | | | |
|---|---|---|---|
| 1,731,162 | 10/1929 | Ficklen | 52/744 |
| 2,853,928 | 9/1958 | Reardon | 264/79 |
| 2,986,544 | 5/1961 | Driscoll | 260/29.7 S |
| 3,140,566 | 7/1964 | Wagner | 52/744 |
| 3,239,479 | 3/1966 | Roenicke | 260/29.7 S |
| 3,240,736 | 3/1966 | Beckwith | 260/29.7 S |
| 3,381,066 | 4/1968 | Lowe | 264/261 |
| 3,421,277 | 1/1969 | Frischmuth | 260/29.6 ME |
| 3,521,418 | 7/1970 | Bartoloni | 52/315 |
| 3,650,995 | 3/1972 | Erickson | 260/29.6 WB |
| 3,660,214 | 5/1972 | Nichols | 52/315 |
| 3,706,696 | 12/1972 | Bernett | 260/29.6 E |
| 3,714,107 | 1/1973 | Smith | 260/29.7 R |
| 3,735,545 | 5/1973 | Bernett | 52/744 |
| 3,866,383 | 2/1975 | Bernett | 52/744 |

FOREIGN PATENTS OR APPLICATIONS 714,782   9/1954   United Kingdom

OTHER PUBLICATIONS

Noble "Latex In Industry" 2 Ed., p. 214, (Rubber Age 1953).
Chemical Abstracts, vol. 56, No. 12, Entry 15667i, June 11, 1962.

*Primary Examiner*—Ernest R. Purser
*Assistant Examiner*—Henry Raduazo
*Attorney, Agent, or Firm*—Morgan, Finnegan, Pine, Foley & Lee

[57] ABSTRACT

Novel aqueous non-hydraulic mortar compositions are disclosed comprising a film-forming, water-dispersible, room temperature cross-linkable polymer and a water-insoluble filler. Setting and grouting of ceramic tile by these compositions are also disclosed.

29 Claims, No Drawings

3,967,429

METHOD OF GROUTING USING SPECIFIC MORTAR COMPOSITION

This is a division of application Ser. No. 304,727 filed Nov. 8, 1972, which is a continuation of application Ser. No. 105,109 filed Jan. 8, 1971, now abandoned.

BACKGROUND OF THE INVENTION

This invention relates to new and improved mortar compositions, which are especially suitable in grouting applications and filling the joints between ceramic tiles. This invention relates to the compositions, the method of grouting using said compositions and the installed product wherein said compositions are used to bond the individual tiles. More particularly, this is concerned with aqueous non-hydraulic grout and thin-bed mortar compositions which comprise a film-forming, water-dispersible cross-linkable polymer and a water-insoluble filler and to the method of grouting and bonding ceramic tile, cement tile, bricks, natural stones, mineral chips, glass tessera and glass plates, employing said compositions.

Conventional mortars for setting tile consist of Portland cement, lime and sand. Water is added to this mixture to obtain workability and to take part in the hardening or curing action by means of which the cement forms a gel. These mortars are not entirely self-curing in that they tend to lose considerable water by evaporation into the surrounding atmosphere and also by absorption into the tile or masonry which is being set. If the water loss is too great, the curing action is incomplete and the mortar becomes soft and chalky. Moreover, these conventional mortars require heavy, thick and generally multiple layers to be placed before setting the tile. This entails the use of large quantities of these materials and considerable labor for mixing, placing and trowelling of such underlayers. In addition, very wet conditions must be maintained for proper hardening and bonding which leads to the troublesome operation of soaking all nonvitreous ceramic tile before setting and the taking of considerable precautions to insure the regulation of such wet conditions during the period of curing. Another disadvantage of such mortars concerns the impracticality of using them over such substrates as gypsum wallboard or plaster.

A more recent innovation in the tile setting industry relates to the use of dry set mortar and grouts. However, these compositions generally stain badly, crack easily and develop poor strength under dry conditions. Furthermore, these materials have poor acid and chemical resistance.

The compositions described in the instant application are essentially free of the undesirable properties which are characteristic of the aforementioned mortar compositions. More specifically, they have easy to trowel non-Newtonian consistencies; they are suitable grouts for filling joints between impervious and absorptive types of ceramic tile; they are suitable for use as thinset mortars; they exhibit minimal shrinkage and they become highly water and stain resistant after a period of time.

SUMMARY OF THE INVENTION

Accordingly, this invention is concerned with aqueous non-hydraulic mortar compositions having a viscosity[1] in the range of 10,000 cps to 1,200,000 cps which comprise a film-forming, water-dispersible, room temperature cross-linkable polymer and a water-insoluble filler. The aforesaid aqueous composition is preferably in the form of an emulsion; however, for purposes of this invention, suspensions, dispersions and partial solutions are also contemplated.

[1] The Brookfield helipath viscosity when measures at 2.5 rpm.

Particularly preferred embodiments of the aforedescribed compositions are those in which the cross-linking process is assisted by the addition of a cross-linking agent or a catalyst. When an acidic catalyst is utilized, it is further preferred to include an activating agent.

Preferred amounts of each component are as follows: It is understood, however, that components A, B and F are essential components whereas the inclusion of C, D and E are preferred embodiments.

| | | |
|---|---|---|
| A. | Water-dispersible, cross-linkable polymer | 2–16% by weight |
| B. | Water-insoluble filler | 50–90% by weight |
| C. | Acidic catalyst | 0.03–2.0% by weight |
| D. | Activating agent | catalytic amounts |
| E. | Cross-linking agent | an amount sufficient to permit substantial cross-linking (at least a stoichiometric equivalent amount) |
| F. | Water | 8–15% by weight |

Particularly preferred water-insoluble fillers include: glass, quartz, silica, limestone, alumina trihydrate and mixtures thereof.

The present invention is also concerned with the method of setting and grouting tile using the aforesaid compositions and to the articles of construction comprising tiles bonded to a support wherein the spaces between the tiles and/or the bonding material between the tiles and support consist of the compositions herein described.

DETAILED DESCRIPTION OF THE INVENTION

The novel mortar compositions of this invention are highly effective for grouting or filling joints between ceramic tiles and for adhering these tiles to various backings. The grout and mortar products resulting from the use of these compositions are especially desirable because they are resistant to water, chemicals (acid and solvent), and U.V. light and, in addition, are stain resistant and have excellent wet characteristics. Moreover, they are easy to apply.

The novel aqueous non-hydraulic mortar compositions of this invention principally comprise:
 a. a film-forming, water-dispersible, room temperature cross-linkable polymer; and
 b. a water-insoluble filler; and
 c. water
in the following preferred amounts:
 a. 2–16% by weight
 b. 50–90% by weight
 c. 8–15% by weight.

The first essential component of the herein disclosed novel composition is the water-dispersible polymer. It is the cornerstone of the entire invention; therefore, its important function shall be discussed first.

It must be capable of cross-linking or curing at room temperature when combined with the other ingredients which make up the entire aqueous composition. One novel aspect, therefore, is its ability to undergo at least preliminary cross-linking under the conditions of typical grout application; namely, in the presence of water and at room temperature. This initial cross-linking of polymer occurs without the usual drying and heating techniques that are normally used when polymer emulsions are used to manufacture nonwoven fabrics. The cross-linking process is then brought to completion, preferably, by the addition or promotion of a catalyst or cross-linking agent. However, after a reasonable period of time, the mortar will set to provide a grout even without the cross-linking agent or catalyst.

Although the mechanism by which the initial cross-linking occurs is not fully understood at the present time, its occurrence is highly unexpected and unusual particularly in light of the operating conditions; the polymer begins to cross-link at room temperature when combined with the other ingredients while in an aqueous environment. Cross-linking is effective once the grouting composition is dried. This initial phase in the overall formation of a highly useful end product is not only unexpected but results in a product which exhibits unusual properties.

A preferred aspect of this invention which relates to the aforedescribed cross-linking process concerns the utilization of a cross-linking aid. This aid can either be a cross-linking agent or a catalyst which accelerates and assists in promoting the cross-linking process to its desired end.

Whether one uses a catalyst or a cross-linking agent depends on the particular polymer used. For instance, to cross-link certain polymers, a cross-linking agent or hardening agent is preferred. A typical example is an epoxy resin. Resins of this type are usually cross-linked by the addition of an amine. Another example of a polymer which can be cross-linked by the addition of a cross-linking agent are certain polyester resins; namely, unsaturated polyester resins where the cross-linking occurs at the unsaturated segments of the polymer chains. In this latter type, the cross-linking agent is a monomer such as styrene, methylmethacrylate, vinyltoluene or diallyl phthalate. In addition to unsaturated polyesters, other polymeric materials can be cross-linked in the same way; namely by copolymerization of the alkene linkage in the polymer with a monomer of the type shown above. These include: 1,4-poly-1,3-dienes, polyolefins and polysiloxanes.

In an analogous fashion, diene momomers can be used as curing or cross-linking agents in order to obtain a cross-linked structure in the final product. Examples of this type are:

methylmethacrylate-ethylene glycol dimethacrylate
vinylacetate-divinyl adipate
styrene-divinyl benzene
methylmethacrylate-allyl methacrylate.

Another cross-linking agent which falls within that term as defined herein is sulfur. Cross-linking of diene polymers such as isoprene butadiene and chloroprene and copolymers such as butadiene-acrylonitrile, butadiene-styrene and isoprene-isobutylene can be accomplished by the use of sulfur as curing agent. The resulting polymers are contemplated by this invention.

Further, polyurethane resins can be cross-linked by diols and diamines. These latter materials are similarly included within the scope of the term cross-linking agent.

The aforesaid cross-linking process is, therefore, the result of an interreaction between reactive groups on the polymer chains accomplished by the addition of a cross-linking or curing agent. This can be shown as follows:

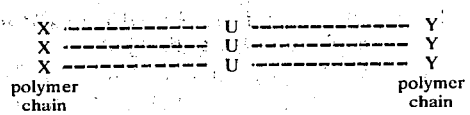

wherein X is a pendant, reactive group on the polymer chain, Y is the same as X or different and U is the cross-linking agent. Of course, the resulting molecule can be 3-dimensional. If the polymers are different, obviously X and Y will be different. This possibility is within the realm of this invention. In the specific case of epoxy resins, the polymer chain substituents are epoxy substituents

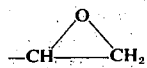

and U is an amine. Applicable crosslinking agents in addition to amines and monomers referred to above, include diols, diepoxides, dicarboxylic acids, N-methylolamides, α-olefin acids, polyvalent metal oxides, hydroxides, methylols, etc. The above list is by no means limiting and simply serves to illustrate representative examples. Any cross-linking agent known in the art of polymerization is contemplated by this invention. The only required characteristic is that it is capable of causing interreaction between the polymer chains and, more particularly, within the functional groups thereon to permit the formation of a chemical bond.

It must be understood that the particular cross-linking agent selected depends to a great extent on the particular polymer utilized. More specifically, it depends on the type of pendant groups which appear on the polymer backbone. For instance, with epoxy resins, amines are the preferred agents for attaining substantial cross-linking.

In the situation where a catalyst is used to assist in the cross-linking process, the polymer is of the type which contains substituents capable of interacting with pendant substituents, which can be the same or different, on other present polymer molecules. If the polymer chains are similar, the substituents will be the same - the converse is also true. Both situations are contemplated by this invention. When cross-linking is accelerated by a catalyst, the interaction is between the substituents directly.

The catalyst material of this invention is preferably an acidic catalyst and, in particular, inorganic and organic salts, organic acids and amine acid-addition salts. Specific examples include ammonium chloride, magnesium chloride, ammonium sulfate, ammonium bromide, ammonium thiocyanate, dichloroacetic acid, p-toluene sulfonic acid, citric acid, oxalic acid, sulfamic acid and 2-methyl-2-aminopropanol-1-hydrochloride. When the catalyst is an acidic catalyst of the type just described, it is sometimes desirable to include an activating agent to accelerate setting. A typical activating agent is formaldehyde; however, those known in the art of polymerization are within the purview of this invention. The amount of said activating agent will generally be in catalytic quantities.

However, depending on the particular polymer utilized, the catalyst material can be different from the acidic catalyst defined above.

For instance, it can be a peroxidic material; polyurethane resins can be cross-linked by using peroxides; and polyethylene, ethylene-propylene copolymers and polysiloxanes are cross-linked by using a peroxide such as dicumyl peroxide or di-t-butyl peroxide.

Another illustrative catalyst material encompassed by the present invention is atmospheric oxygen which effectively cross-links unsaturated polyesters (alkyds) usually in the presence of metal ions (cobalt, manganese, iron, lead and zinc) in the form of carboxylic acid salts.

Another suitable catalyst for certain polymers is radiating light. Radiation effectively cross-links polyethylene and ethylene copolymers.

It is apparent from the above discussion that the polymer backbone is not critical it may be homopolymeric, copolymeric or mixtures thereof. The polymer may be an addition polymer as illustrated by polyolefins, polyvinyl compounds, polyepoxides and polyacetals or the polymer may be of the condensation type as represented by polyesters and polyamides. Furthermore, for purposes of this invention, the particular polymer structure is not critical - it includes, therefore, polymers which are trans, cis, isotactic, syndiotactic, tritactic, atactic and all other possibilities.

The copolymer type may be random, alternating or block. Graft copolymers are also contemplated. Still further, terpolymers are within the scope of this invention.

Accordingly, the critical feature of the polymer is the substituents which are contained thereon. More particularly, the polymers must contain substituents which allow the polymer to undergo an initial cross-linking which continues to substantial completion. Hence, the polymer must be film-forming; it must be water-dispersible; and it must be capable of curing at room temperatures while in the aqueous state.

The substituents which are formed on the polymer backbone and which are capable of providing a polymer having the necessary properties defined above are numerous and the following is only a representative listing:

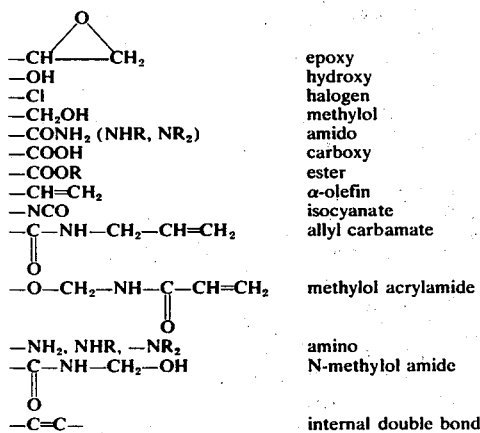

| | |
|---|---|
| —CH—CH₂ (epoxide) | epoxy |
| —OH | hydroxy |
| —Cl | halogen |
| —CH₂OH | methylol |
| —CONH₂ (NHR, NR₂) | amido |
| —COOH | carboxy |
| —COOR | ester |
| —CH=CH₂ | α-olefin |
| —NCO | isocyanate |
| —C(=O)—NH—CH₂—CH=CH₂ | allyl carbamate |
| —O—CH₂—NH—C(=O)—CH=CH₂ | methylol acrylamide |
| —NH₂, NHR, —NR₂ | amino |
| —C(=O)—NH—CH₂—OH | N-methylol amide |
| —C=C— | internal double bond | wherein R is normally alkyl.

The above shown examples are not limiting; rather, only representative of the many possible substituents which are capable of imparting the desired properties to the polymers applicable for purposes of this invention.

Polymers which contain substituents of the type exemplified above include:
urea-formaldehyde resins
melamine-formaldehyde resins
polysiloxanes
phenolic resins
polyamides
polyesters
polyurethanes
polyacrylates
epoxy resins
polyacetals
polyacrylonitrile
polyalkyl methacrylates
polyalkyl acrylates
polyvinyl alcohol esters
polyvinylidene chloride
polyolefins The molecular weight range of the polymers used in the herein disclosed novel compositions can vary from 500 to one million depending on the particular polymer. For purposes of this invention, the preferred polymers are those which are either commercially available or easily synthesized using well-documented techniques. The molecular weight is not the deciding parameter insofar as the inventive aspect is concerned. Rather, as explained above, it is the ability of the polymer having certain reactive substituents to undergo cross-linking at room temperature under aqueous conditions to provide a highly effective grouting composition.

The aqueous compositions when all the components are combined are usually in an emulsion state. In fact, the polymer used herein typically exits in an emulsion and is usually commercially available in that particular state. Although an emulsion is most preferred, it is also possible to have a dispersion, suspension or partial aqueous solution.

A partial aqueous solution exists when a portion of the polymer molecule is water soluble or when the cross-linking agent is water soluble.

It is important to recognize that when cross-linking begins and during its progression, water is present. This is an unusual property for acid catalyzed polymerization.

It should be recognized also that the aqueous composition of this invention can provide effective grouting compositions despite the omission of a cross-linking agent or catalyst. However, the rate of interreaction and, more specifically, cross-linking, is slower under such conditions and, therefore, although operable, is less preferred. It is therefore advantageous to include a cross-linking agent or catalyst to accelerate the rate of curing. Accordingly, their inclusion constitute the preferred embodiments of this invention.

The second principal ingredient in the novel aqueous compositions of this invention is a water insoluble filler. Illustrative of the fillers which may be employed are glass, such as crushed glass, quartz, silica, barytes, limestone, alumina, various clays, diatomaceous earth and other like inert materials, wollastonite, mica, flint powder, kryolite, alumina trihydrate, talc, sand, pyrophyllite, blanc fixe, granulated polyethylene, zinc oxide and mixtures thereof. A preferred combination consists of a mixture of glass, quartz, silica and alumina trihydrate.

The amount of filler added is in the range from 50% to 90% by weight of the total composition. The filler is water-insoluble; therefore, when it is combined with the other ingredients of the composition, it will be emulsified, dispersed or suspended.

The compositions of this invention may also contain a water-soluble, water-retentive agent such as methyl a cellulose, hydroxyethyl cellulose, ethyl cellulose and carboxymethyl hydroxyethyl cellulose. The amount added is not critical. Since such materials are known to be useful in preparing grouting compositions, the additive amounts are known to those who work in this art. These materials assist in controlling thixotropy and viscosity characteristics.

In addition, there may also be added to the compositions other ingredients which are generally used in preparing mortar and grouting compositions. For instance, coloring agents, stabilizers foam breakers, dispersants, wetting agents, emulsifiers, fungicides and the like may be included. Illustrative of coloring materials which may be added are titanium dioxide, cadmium red, carbon black, aluminum powder and the like.

The present invention is also concerned with the application of the herein disclosed compositions in setting and grouting tile. They are particularly adapted for use as trowellable grouts or mortars to set ceramic tiles and to fill the joints between the tiles. They bond exceedingly well to the ceramic tile edges and to the backs of ceramic tile. In grouting, an assembly containing a plurality of ceramic tile in edge to edge relationship with spaces between the tiles is prepared and the spaces between the tile filled with the compositions of this invention. When used to set and grout ceramic tile, the compositions form a hard, adherent, chemically resistant bond between the backs of said ceramic tile and the substrate.

Additionally, this invention is concerned with the article of construction consisting of the ceramic tile product comprising ceramic tile in which the spaces therebetween are grouted with the herein disclosed compositions.

The following examples are provided for illustrative purposes and may include particular features of the invention. However, the examples should not be construed as limiting the invention, many variations of which are possible without departing from the spirit or scope thereof.

EXAMPLE I

A mixture is prepared containing the following components:

| Component | Percentage | Amount |
|---|---|---|
| 1. Acrylic polymer A* | 16.8675 | 1349.40 grams |
| 2. Acrylic polymer B* | 4.2170 | 337.36 grams |
| 3. Silica (96% through 325 mesh) | 20.7608 | 1660.86 grams |
| 4. Silica 5 Micron Average Particle Size | 9.4906 | 759.25 grams |
| 5. Glass 74–149 Microns Particle Size Range | 9.4906 | 759.25 grams |
| 6. Glass 44–5 Microns Particle Size Range | 9.4906 | 759.25 grams |
| 7. Titanium dioxide | 2.2252 | 178.02 grams |
| 8. Potassium tripolyphosphate | .1077 | 8.62 grams |
| 9. Methyl cellulose 15,000 cps. viscosity | .0215 | 1.72 grams |
| 10. Antifoam agent | .1077 | 8.62 grams |
| 11. Powdered Alumina Trihydrate | 26.9621 | 2156.97 grams |
| 12. Fungicide | .2372 | 18.98 grams |
| 13. Antifoam | .0215 | 1.72 grams |
| | 100.0000% | 8000.02 grams |

*Thermosetting acrylic polymer emulsion with functional methylol acrylamide - acid crosslinkable - groups, 45% solids, viscosity 30 to 200 cps, pH of 8.5–9.5, surface tension of 46 dynes per cm., and capable of forming flexible films, with a modulus of E=6.5 × 10³ psi. after drying and then baking at 350°F for 30 minutes. An example of this general type of polymer that worked is Rhoplex E172, supplied by Rohm and Haas company, Independence Mall West, Philadelphia, Pennsylvania 19105.
**Thermosetting acrylic emulsion polymer with functional acid crosslinkable groups, 60% solids, viscosity 40 to 120 cps. A commercial brand of this polymer that was found to work was E-660 obtained from Rohm and Haas Company.

The above composition is prepared by mixing the components in a high speed mixer. The resulting product has a viscosity of 120,000 cps. and a specific gravity of 1.84. It contains about 10% by weight total water.

Shelf stability of these formulations is noted to be exceedingly good. Even after nine months, no change is detected in stored samples. This product is suitable for use as a tile mortar and tile grout. For instance, a portion of this formulation was used to grout a panel of wall tile. The next day, the grout was hard and gave the appearance of a typical tile grout.

To 200 grams of the formulation described above was added 1 gram of ammonium chloride catalyst. The resulting material was used to grout a panel of glazed wall tile. On the following day, the grout was harder than the uncatalyzed grout and more difficult to dig out by fingernail.

After 21 days the catalyzed grout was more stain and water resistant than the 21 day old uncatalyzed grout and extremely hard.

Smooth silica sand may be used in place of the crushed glass, ingredients 5 and 6 above.

EXAMPLE II

To 400 gram amounts of the formulation described in Example I is added the following amounts of ammonium chloride catalyst. The samples are then tested by a Gilmore needle according to ASTM C266, for their setting in a 100% humidity cabinet. The following results were obtained:

| Crosslinking Grout/Ammonium Chloride | Initial Setting Time |
|---|---|
| 1. 400 grams/1 gram | 12 hrs. 36 min. |
| 2. 400 grams/2 grams | 8 hrs. 34 min. |
| 3. 400 grams/3 grams | 3 hrs. 54 min. |
| 4. 400 grams/4 grams | Stiffened while mixing |

The above described experiment substantiates that practical setting times are obtainable under humid conditions where the herein disclosed compositions are used.

Setting time capacity is very advantageous to the installation of tile. In the case of grout application, the catalyzed grout firms in the joint allowing the surface to be wiped clear of smears. In the case of adhering tile, the catalyzed mortar (grout) firms up, securing the tile so that they can be grouted almost immediately without dislodgement of tiles.

EXAMPLE III

The procedure of Example II is repeated except that catalytic amounts of formaldehyde were added to each of the catalyzed compositions. In each instance, the setting time was decreased substantially. To 400 grams of the composition of Example I, 10 grams of formalin 37% solution were added. Then 3 grams of ammonium chloride were added to catalyze the composition. The fast set time of 25 minutes was obtained.

EXAMPLE IV

A 400 gram sample of the grout composition prepared according to the procedure of Example I was mixed with 2 grams of 12.5% sulfamic acid water solution. The set time under 100% humidity was even shorter than was obtained with the ammonium chloride. Sulfamic acid was found to be a suitable catalyst.

EXAMPLE V

The composition prepared according to Example IV is used as a grouting composition in the following manner:
1. The grout is trowelled on the wall and into the joints between the tiles;
2. The excess material is washed from the tile faces;
3. The joints are tooled to obtain the final general contour desired;
4. The wall is rewashed and the joints are shaped as desired with a sponge; and
5. The tile is wiped clean with a dry cloth after the remaining residue dried on the tile face.

EXAMPLE VI

To the surface of a 4 ft. by 5 ft., 2 inch thick panel of cut-cell expanded polystyrene, impervious ceramic mosaic tiles and absorptive dry glazed wall tiles were adhered each with each of the following three mortar compositions A, B and C. At successive time intervals attempts were made to pry-off individual tiles.
A. Mortar composition of Example I with no catalyst.
B. Mortar composition of Example I with 0.50% ammonium chloride.
C. Mortar composition of Example I with 0.75% ammonium chloride.

| Times After Application | Compositions Used | OBSERVATIONS Ceramic Mosaics | Wall Tiles |
| --- | --- | --- | --- |
| 2 hrs. | A | pried off easily | pried off easily |
| 2 hrs. | B | pried off easily | breaks tile |
| 2 hrs. | C | pried off easily | breaks tile |
| 7 hrs. | A | pried off easily | breaks tile |
| 7 hrs. | B | pried off easily | very tightly bonded |
| 7 hrs. | C | pried off easily | very tightly bonded |
| 24 hrs. | A | pried off easily | very tightly bonded |
| 24 hrs. | B | dif. to pry off | very tightly bonded |
| 24 hrs. | C | dif. to pry off | very tightly bonded |

From the above table the observer noted that glazed wall tiles were sufficiently bonded to the panel for grouting before two hours for the catalyzed mortar, but were not firm until 4 hours for the uncatalyzed. Ceramic mosaics were not sufficiently bonded by the catalyzed mortar to permit easy grout application until 24 hours.

Tiles were speedily set and grouted with the catalyzed composition of Example I on expanded polystyrene panels to form prefabricated ceramic tile surfacing units. These highly water resistant units were used over a typical tub.

EXAMPLE VII

A sample of mortar based on the formula in Example I was applied to an aluminum sheet 0.050 inches thick. Samples of ceramic tile, glass tile, quarry tile and wall tile were set on the sheet. The test was repeated using catalyzed grout. In all cases time when tiles could not be pried off easily was lessened by the use of catalyst. The tiles were then grouted with the same formulations.

EXAMPLE VIII

A sample of the mortar composition based upon the formula described in Example I was applied to a cinder block. Stones were pressed in the plastic mortar layer to form a decorative exposed aggregated surfacing. A second similar sample was prepared in the same manner except that 0.75% by weight of ammonium chloride catalyst was added to the formulation. Freshly applied stones were observed to cling better to the catalyzed mortar. The catalyzed composition demonstrated improved bonding when one attempted to pry off a 1 inch diameter stone. The rapid extra stiffening caused by catalyst addition improved the application. After 15 days, water soak test and scratch tests indicated an improved water resistant product was obtained. After 30 days the product was exceptionally hard after immersion in water for three days.

EXAMPLE IX

A sample of the mortar based on the formula in Example I was used to bond wall tile, quarry tile and ceramic mosaic tile to wall board, cut cell styrene board, insulation block, insulation board, plywood, cement board, cardboard, composition board, cinderblock, cement block, brick and sheet aluminum. The above samples were repeated using the catalyzed mortars of Example I. The advantages of rapid stiffening or short set time over nonporous surfaces were noted with catalyzed mortar. When wetted, the tiles were not easily pried off the different backings when the uncatalyzed mortar had been used as the adherent.

EXAMPLE X

A composition was prepared having the following formula:

| | Component | Percentage | Amount |
| --- | --- | --- | --- |
| 1. | Acrylic polymer A of Example I | 7.8921 | 157.8 grams |
| 2. | Acrylic polymer B of Example I | 1.7238 | 34.4 |
| 3. | Water | 10.7690 | 215.2 |
| 4. | Silica (96% through 325 mesh) | 21.5838 | 431.6 |
| 5. | Silica 5 Micron Average Particle Size | 9.8658 | 197.2 |
| 6. | Glass 74–149 microns particle size range | 9.8658 | 197.2 |
| 7. | Glass 44–5 microns particle size range | 9.8658 | 197.2 |
| 8. | Titanium dioxide | 1.1364 | 20.6 |
| 9. | Potassium tripolyphosphate | 0.0550 | 1.0 |
| 10. | Methyl cellulose 15,000 cps. viscosity grade | 0.0109 | 0.2 |
| 11. | Antifoam | 0.0655 | 1.2 |
| 12. | Powdered Alumina Trihydrate | 27.0323 | 540.6 |
| 13. | Fungicide | 0.1211 | 2.4 |
| 14. | Ammonium hydroxide (stabilizer) | 0.0127 | 0.2 |
| | | 100.0000% | 1996.8 grams |

The resulting composition with less binder than Example I has a viscosity of 16,000 cps. and a water content of about 14%. The composition was found to be acceptable when applied as a grout and mortar to wall tile.

EXAMPLE XI

A sample of the mortar prepared according to the procedure of Example I with ammonium chloride catalyst was used in the Grout Application Index Test. This test measures the time required to grout 22 square feet of 4¼ inch glazed wall tile. The grout formula of Example I was applied in 13.5 minutes. The time savings is significant when a high performance tile installation is wanted at low installation labor cost.

EXAMPLE XII

The procedure of Example I is repeated to prepare similar compositions except the following water-insoluble fillers are used in the following percent by weight amounts instead of the silica-glass-aluminum trihydrate system:

| | |
|---|---|
| silica | 75% by weight |
| aluminum | 80% by weight |
| glass-sand (50:50) | 85% by weight |
| quartz | 90% by weight |
| aluminum-trihydrate-talc (50:50) | 80% by weight |
| granulated polyethylene | 50% by weight |

EXAMPLE XIII

A sample of the mortar based on the formula in Example I with catalyst was used to set and grout 1 inch ceramic mosaic tile on a dry concrete slab for testing by ASTM Method C627-70. Setting and grouting was completed after 3 hours. The floor test slab passed light performance level 20 hours after setting, indicating a rapid development of strength. Thus, tiles were installed and ready for use within 24 hours.

EXAMPLE XIV

The following experiment was carried out to show a comparison between catalyzed and uncatalyzed grout compositions. The compositions applied as grouts between glazed wall tiles were subjected to wet abrasion tests which employ the Standard Gardner Scrub Tester. 1,000 scrub cycles in the machine gave the following results:

| | |
|---|---|
| Grout From Examples No. 1 With 0.5% NH₄Cl catalyst (after 24 hours) | 0.006 inches scrubbed off |
| Grout From Example No. 1 With Catalyst (after 3 days) | 0.000 inches scrubbed out |
| Grout From Example No. 1 Without Catalyst (after 30 days) | 0.029 inches scrubbed off |

Grout samples disclosed in the present invention also showed improved stain resistance.

EXAMPLE XV

The following test demonstrated the excellent wet shear strength exhibited by the compositions of this invention. Bonded tile assemblies of mortar based upon the composition described in Example I with and without catalysts were tested according to American National Standards Institute Test for Organic Adhesives ANSI 136.1, 1967. Following are results in pounds per square inch:

| | Shear Bond Strength | |
|---|---|---|
| | Dry | Wet |
| Without Catalyst | 508 psi | 55 psi |
| With Catalyst | 510 psi | 230 psi |
| Commercial brand noncrosslinking type grout | 460 psi | 30 psi |

No commercial grouts presently available have produced a wet bond in excess of 40 psi as determined by the above test.

EXAMPLE XVI

A test of the grout based on the formula of Example I was tested in a countertop type application.

A test was devised in which various concentration food acids flowed over (a) a catalyst cured "countertop grout," formula of Example I, (b) commercial brand noncross-linking grout and (c) conventional Portland cement, wet cured grout.

A pump is utilized to flow the acid solution over the cross-linking grout. The solution then flows over non-cross-linking grout and finally over the conventional, wet cured cement grout in sequence. Erosion is measured after flow over five identical previously measured sections of grout on each panel section for each chemical solution tested. Actual depth of erosion in mils after 30 hours of operation are listed in the following table:

| | | C | B | A |
|---|---|---|---|---|
| (1) | 10% acetic acid | 38.6 | 7.2 | 2.4 |
| (2) | 40% citric acid | 25.4 | 12.0 | 1.6 |

This example is cited to demonstrate the superior acid resistance of a grout based on a cross-linking resin system.

EXAMPLE XVII

A test for the determination of resistance to solvents was developed. The test showed the improved solvent resistance of the grout formulas of this invention.

Hardened grout samples were dug out of tile joints. In the test, approximately 2 g. of the sample was weighed to the nearest 0.1 mg. and placed in a 4-ounce jar with 100 ml. of acetone.

Each of the jars were stirred 2 hours by a magnetic stirrer. The contents of the jars were then filtered through glass wool, and the filtrate collected in a tared 4-inch evaporating dish. The jar and glass wool filter were rinsed with acetone and collected in the evaporating dish.

When the filtrate in the evaporating dish was evaporated to constant weight, the percent of acetone insolubles were as follows:

$$\frac{[(\text{Weight of Grout Sample}) - (\text{Weight of Residue})] \times 100}{[\text{Weight of Grout Sample}]} = \text{Percent Acetone Insolubles}$$

A sample of grout based on uncatalyzed formulation in Example I had an acetone insolubles of 96.59 percent. A sample of the same grout, but with 0.5% NH₄Cl catalyst indicated acetone insolubles of 98.02 percent. Samples of grout based on commercial brand noncrosslinking type resin system gave acetone insolubles of 88.0 percent.

EXAMPLE XVIII

The test procedure of Example XVII showed that the solvent resistance at room temperature for the catalyzed grout formula of this invention was equivalent to solvent resistance of the noncatalyzed grout that had been heat cured. All four of the following samples were aged 21 days at room temperature:

| | |
|---|---|
| No catalyst | 97.2% insoluble |
| 0.5% NH₄Cl catalyst | 98.8% insoluble |
| No catalyst 1/2 hr. at 150°C. | 98.7% insoluble |
| 0.5% NH₄Cl Catalyst 1/2 hr. at 150°C. | 100.0% insoluble |

EXAMPLE XIX

The following composition demonstrated that polyvinyl acetate copolymer emulsions are applicable for preparing grouts of this invention.

| | Component | Percentage | Amount |
|---|---|---|---|
| 1. | P.V.Ac. Acrylic Copolymer emulsion | 19.0873 | 381.746 grams |
| 2. | Water | 5.4225 | 108.4500 |
| 3. | Silica (96% through 325 mesh) | 22.5189 | 450.378 |
| 4. | 5 Micron Silica | 7.7407 | 154.814 |
| 5. | Glass (74–149 microns) | 7.7407 | 154.814 |
| 6. | Glass (44–45 microns) | 7.7407 | 154.814 |
| 7. | Titanium dioxide | 1.7813 | 35.626 |
| 8. | Potassium tripolyphosphate | .0812 | 1.624 |
| 9. | Methyl cellulose 15,000 cps viscosity | .0169 | 0.0338 |
| 10. | Antifoaming agent | .0973 | 1.9012 |
| 11. | Powdered Alumina Trihydrate (Mean particle 80 micron) | 27.5771 | 551.542 |
| 12. | Fungicide | .1951 | 3.3449 |
| | | 99.9997% | 1999.994 grams |

The above grout formula was found suitable for filling the joints between glazed wall tile. The viscosity was 104,000 cps. and the specific gravity was 1.47.

The polyvinylacetate acrylic copolymer aqueous emulsion had methylol reactivity and, therefore, could be cross-linked at room temperature by addition of acid catalysts, such as, oxalic acid, ammonium thiocyanate, and ammonium chloride. Commercial brand 55 DEV, made by Franklin Chemical Company, 2020 Brush Street, Columbus, Ohio 43207, is an example of this resin emulsion.

EXAMPLE XX

A mortar based on the following components was prepared:

| | Component | Percentage | Amount |
|---|---|---|---|
| 1. | Acrylic polymer A of Example I | 15.30 | 765 |
| 2. | Water | 2.60 | 130 |
| 3. | Ultra Marine Blue | 15.02 | 1.00 |
| 4. | Antifoaming agent | .20 | 10 |
| 5. | Hydroxyethyl cellulose | .025 | 1.25 |
| 6. | Limestone particle size 5 microns | 7.40 | 370 |
| 7. | Ground Silica (−325 mesh) | 8.30 | 415 |
| 8. | Potassium tripolyphosphate | .10 | 5 |
| 9. | Alumina trihydrate | 10.20 | 510 |
| 10. | Sand (−30 mesh) (−100 mesh) | 55.31 | 2765.5 |
| 11. | Fungicide | .15 | 7.5 |
| | | 99.605% | 4980.25 grams |

The mortar based on the components listed had viscosity of 740,000 centipoise and specific gravity of 1.90. When 0.5% ammonium chloride was mixed into this mortar, it formed a grout suitable for filling joints between vitreous tiles. After a week at room temperature, the grout was exceptionally hard, stain and water resistant.

In place of ammonium chloride, the following acidic catalysts in the amounts shown are substituted for ammonium chloride with comparable results:

| | |
|---|---|
| ammonium bromide | 0.03% |
| ammonium thiocyanate | 0.05% |
| ammonium sulfate | 1% |
| ammonium thiocyanate | 1% |
| dichloroacetic acid | 0.03% |
| p-toluene sulfonic acid | 0.04% |
| citric acid | 2% |
| oxalic acid | 0.5% |
| sulfamic acid | 0.03% |
| 2-methyl-2-aminopropanol HCl | 0.5% |
| 1-amino-4-butanol HCl | 1% |

EXAMPLE XXI

The procedure of Example I is repeated to prepare a similar composition except the following percent by weight amounts of polymer material is used to provide suitable compositions:

| | |
|---|---|
| 2% (+15% water) | 11% (+10% water) |
| 5% (+14% water) | 14% (+13% water) |
| 7% (+13% water) | |
| 8% (+12% water) | |

EXAMPLE XXII

Mortars based on the formula in Examples I and XIX were colored with common latex paint store coloring systems. In all cases pigments were compatible and the mortars got hard and water resistant with catalyst. After 15 days, the colored mortars were tested for hot water softening. The catalyzed mortars softened in water at higher temperatures than uncatalyzed mortars. The degree of softening was also less. Also, a satisfactory method of coloring the mortars was to combine the pigment with the catalyst and then add to the emulsion system.

EXAMPLE XIII

A catalyzed mortar of low viscosity based on the formula in Example I was added to wet Portland cement mortar. The mortar was applied to an aluminum sheet. Several pieces of tile were set in the mortar on this sheet. Also, for comparison, other tiles were set on the sheet with plain Portland cement mortar. After 24 hours aging at room temperature, the catalyzed mortar was noted to be tightly bonded.

EXAMPLE XXIV

Another typical room temperature cross-linking polymer emulsion found suitable for producing the ceramic setting mortars of this invention was vinyl acetate copolymer latex, 45% solids, 0.14 micron particle size, pH 4.7, viscosity 100 cps and minimum film (brittle) forming temperature 13°C. This is a thermosetting emulsion that ordinarily is used to bind fibers into nonwoven fabrics by drying and applying high temperature. An example of this emulsion that produced a suitable mortar was X-LINK 2802 brand furnished by National Starch and Chemical Corporation, 750 Third Avenue, New York 10017.

Where used to replace both emulsions 1 and 2 of the formula of Example I, a mortar was formed suitable for grouting and adhering ceramic tiles to gypsum wallboard and concrete masonry.

EXAMPLE XXV

When a self-reactive vinyl acrylic terpolymer latex, 45% solids, pH 4.6, viscosity 200 centipoise, average anionic particle size 0.14 micron was used in place of the vinyl acetate copolymer emulsion of Example XXIV. A suitable mortar was obtained.

EXAMPLE XXVI

The following aqueous composition was prepared:

| | Component | Percentage | Amount |
|---|---|---|---|
| 1. | Polymer A of Example I | 3.7063 | 168.6720 |
| 2. | Polymer B of Example I | 0.9178 | 41.768 |
| 3. | Water | 13.9081 | 632.940 |
| 4. | Antifoaming agent | .9234 | 5.168 |
| 5. | Silica | 30.3334 | 1380.432 |
| 6. | Methyl cellulose 15,000 cps. | .0377 | 1.720 |
| 7. | Potassium tripolyphosphate | .0946 | 4.308 |
| 8. | TiO$_2$ | 1.9558 | 89.008 |
| 9. | Silica 3 microns average particle size | 8.3418 | 379.624 |
| 10. | Glass 74–149 microns particle size range | 8.3418 | 379.624 |
| 11. | Glass 44–5 microns particle size range | 8.3418 | 379.624 |
| 12. | Aluminum trihydrate | 23.6984 | 1078.484 |
| 13. | Fungicide | .2084 | 9.488 |
| | | 99.9993% | 4550.850 grams |

This is mortar containing the very low concentration of 4.6% wet or 2.5% dry of cross-linkable polymer emulsion. It is used to fill the joints between ceramic tile. It had good application consistency, cleaned up usually easily and hardened satisfactorily.

A similar usable low polymer content mortar was prepared by substituting 200 grams of hydroxymethyl derivative of diacetone acrylamide, copolymer latex, 45% solids, pH 4.3 for the polymers A and B above. A commercial example of this copolymer emulsion is Lubrizol 2240, obtained from The Lubrizol Corporation, P.O. Box 3057, Cleveland, Ohio 44117.

EXAMPLE XXVII

The following grout component was made:

| Component A | Percent |
|---|---|
| Thermoplastic acrylic emulsion polymer* | 21.5 |
| Water | 1.13 |
| Surfactant | 0.23 |
| Blue Pigment | 0.02 |
| Antifoam agent | 0.11 |
| Hydroxyethyl Cellulose | 0.03 |
| –325 Mesh Ground Silica | 17.43 |
| Alumina Trihydrate (–100 mesh) | 11.94 |
| Ammonium chloride | 0.56 |
| Sand passing No. 30 mesh | 46.90 |
| Defoaming Agent | 0.12 |
| | 100.00 |

*This latex was typical of thermoplastic acrylic emulsion polymer with functional carboxyl pendant groups, 55% solids, pH 4.5, viscosity under 300 cps, anionic particle charge had a film forming temperature less than 2°C, glass point at –9°C and was flexible. A commercial example of the emulsion that gave the above results is Rhoplex LC-40 available from Rohm and Haas Company, Independence Mall, West, Philadelphia, Pennsylvania 19105.

A second component was made:

| Component B | |
|---|---|
| Dimethylolurea | 6 |
| Water | 18 |
| Blanc Fixe (Barium Sulfate Powder) | 25.45 |
| Sand passing No. 30 mesh | 50.48 |
| Magnesium oxide powder | .07 |
| | 100.00 |

400 grams of component A were mixed with 100 grams of component B. The resulting grout had a trowelable viscosity of about 230,000 cps and hardened between ceramic tiles overnight at 100% humidity.

EXAMPLE XXVIII

Thermosetting polyvinylchloride acrylic copolymer emulsions are found to produce a mortar with the good properties of this invention. Following is a complete mortar formula found suitable for filling joints (grouting) and setting (adhering ceramic tile).

| | Component | Percentage | Amount | |
|---|---|---|---|---|
| 1. | Vinylchloride Copolymer* | 22.96 | 1836.8 | grams |
| 2. | Silica (96% through 325 mesh) | 20.27 | 1621.6 | |
| 3. | Silica 5 micron average | 9.26 | 740.8 | |
| 4. | Glass 74–149 microns particle size range | 9.26 | 740.8 | |
| 5. | Glass 44–5 microns particle size range | 9.26 | 740.8 | |

-continued

| | Component | Percentage | Amount |
|---|---|---|---|
| 6. | Titanium dioxide | 2.19 | 175.2 |
| 7. | Potassium tripolyphosphate | .10 | 8.0 |
| 8. | Methyl cellulose 15,000 cps viscosity | .0209 | 1.6720 |
| 9. | Antifoaming agent | .12 | 9.6 |
| 10. | Powdered Alumina Trihydrate | 26.32 | 2105.6 |
| 11. | Fungicide | .24 | 19.2 |
| | | 100.0009% | 8000.0720 grams |

*This was a thermosetting polyvinylchloride acrylic copolymer emulsion, 51% solids, pH 2.2, viscosity 200 cps, particle charge. Anionic, surface tension 37 dynes per cm. and glass transition temperature over 26°C. In the instant invention, acid catalysts were used to obtain cure in the presence of water. A commercial brand found suitable for tile mortars was Geon 460 XI vinyl chloride copolymer produced by B. F. Goodrich Company, 3135 Euclid Avenue, Cleveland, Ohio 44115.

EXAMPLE XXIX

A polymer emulsion is prepared in the following general way for use in the tile-setting mortar of this invention.

A mixture of 85 parts vinyl acetate monomer, 12 parts of dioctyl fumarate monomer and 3 parts of methylol acrylamide is added over a three hour period to 50 parts of 60°F water containing 0.1% of a sodium salt of an alkylaryl polyether sulfonate and the initiator potassium persulfate. The batch is constantly agitated. First the mixture is heated to 70°F and held at that temperature for about an hour. Then an additional 50 parts of water containing 1.5% potassium persulfate is added over a 1½ hour period maintaining the 70°F temperature of the batch. Then the batch is held, continuing agitation, for 1 hour more at 70°F and finally allowing the temperature to rise to 80°F for one more hour. 200 grams of the cross-linkable vinyl acetate copolymer emulsion so formed is cooled, filtered, and substituted for polymer ingredients A and B of Example I to form a mortar suitable for grouting and setting ceramic tiles on various substrates.

EXAMPLE XXX

The procedure of Example I is repeated to prepare a similar composition except instead of polymers A and B, the following polymers, in equivalent amounts, are used (in emulsion form) together with the shown catalyst or cross-linking agent:

| Polymer | Cross-linking Agent | Catalyst |
|---|---|---|
| Epoxy resin reaction product of epichlorohydrin and Bisphenol A) | ethylene diamine | |
| polyisoprene | diallyl phthalate | |
| polymethylmethacrylate | allyl methacrylate | |
| polyurethane resin | ethylene diamine | |
| polyurethane resin | | dicumyl peroxide |
| ethylene-propylene block copolymer | | di-t-butyl peroxide |
| polysiloxane resin | | di-t-butyl peroxide |
| alkyd resin | | atmospheric oxygen |
| polyvinylidene chloride | | p-toluene sulfonic acid |
| polyacrylonitrile | | succinic acid |
| urea-formaldehyde resin | | carbonic acid |

In those instances where a cross-linking agent is used, a stoichiometric equivalent amount is added whereas with the catalysts, catalytic amounts are used.

What is claimed is:

1. A method of setting and grouting tile which comprises employing at room temperature an aqueous non-hydraulic mortar composition having a viscosity of about 120,000 cps comprising about 10% by weight (solids) of a mixture of film-forming, room temperature cross-linkable polymers in the form of an emulsion, suspension, dispersion or partial solution consisting of an acrylic resin having methylol acrylamide and acid cross-linkable groups and about 77% by weight (solids) of a water-insoluble filler consisting of a mixture of silica, glass and alumina trihydrate.

2. A method of setting and grouting tile which comprises employing at room temperature an aqueous non-hydraulic mortar composition having a viscosity of about 16,000 cps comprising about 5% by weight (solids) of a mixture of film-forming, room temperature, cross-linkable polymers in the form of an emulsion, suspension, dispersion or partial solution consisting of an acrylic resin having methylol acrylamide and acid cross-linkable groups and an acrylic polymer having acid cross-linkable groups and about 77% by weight (solids) of a water-insoluble filler consisting of a mixture of silica, glass and alumina trihydrate.

3. A method of setting and grouting tile which comprises employing at room temperature an aqueous non-hydraulic mortar composition comprising about 2.5% by weight (solids) of a mixture of film-forming, room temperature, cross-linkable polymers in the form of an emulsion, suspension, dispersion or partial solution consisting of an acrylic resin having methylol acrylamide and acid cross-linkable groups and an acrylic polymer having acid cross-linkable groups and about 77% by weight (solids) of a water-insoluble filler consisting of a mixture of silica, glass and alumina trihydrate.

4. A method of setting and grouting tile which comprises employing at room temperature an aqueous non-hydraulic mortar composition having a viscosity of about 740,000 cps comprising about 7% by weight (solids) of a film-forming, room temperature, cross-linkable polymer in the form of an emulsion, suspension, dispersion or partial solution, said polymer being an acrylic resin having methylol acrylamide and acid cross-linkable groups and about 80% by weight (solids) of a water-insoluble filler consisting of silica, sand, limestone and alumina trihydrate.

5. A method of setting and grouting tile which comprises employing at room temperature an aqueous non-hydraulic mortar composition having a viscosity in the range of 10,000 to 1,200,000 cps comprising a film-forming, room temperature cross-linkable polymer in the form of an emulsion, suspension, dispersion or partial solution, having reactive substituents on the polymer chain selected from the group consisting of epoxy, hydroxy, methylol, carboxy, ester, α-olefin, isocyanate, methylol acrylamide, amino, N-methylol amide, internal double bond and combinations thereof wherein said reactive substituents are capable of reacting at room temperature to cross-link said polymers, a water-insoluble filler selected from the group consisting of glass, quartz, silica, limestone, barytes, wollastonite, mica, flint powder, kryolite, alumina trihydrate, talc, pyrophyllite, zinc oxide and mixtures thereof, and an acid catalyst cross-linking aid which is ammonium chloride, said polymer comprising from 2% to 16% by weight, and said filler from 50% to 90% by weight, and said cross-linking aid from 0.03% to 2.0% by weight of the total aqueous composition.

6. The method of setting and grouting tile according to claim 5 wherein the reactive substituents include hydroxy groups.

7. The method of setting and grouting tile according to claim 5 wherein the reactive substituents include methylol groups.

8. The method of setting and grouting tile according to claim 5 wherein the reactive substituents include carboxy groups.

9. The method of setting and grouting tile according to claim 5 wherein the reactive substituents include methylol acrylamide groups.

10. The method of setting and grouting tile according to claim 5 wherein the reactive substituents include amino groups.

11. The method of setting and grouting tile according to claim 5 wherein the reactive substituents include N-methylol amide.

12. A method of setting and grouting tile which comprises employing at room temperature an aqueous mortar composition having a viscosity in the range of 10,000 to 1,200,000 cps comprising a film-forming, room temperature cross-linkable polymer in the form of an emulsion, suspension, dispersion or partial solution, having reactive substituents on the polymer chain selected from the group consisting of epoxy, hydroxy, methylol, carboxy, ester, α-olefin, isocyanate, methylol acrylamide, amino, N-methylol amide, internal double bond and combinations thereof wherein said reactive substituents are capable of reacting at room temperature to cross-link said polymers, a water-insoluble filler selected from the group consisting of glass, quartz, silica, limestone, barytes, wollastonite, mica, flint powder, kryolite, alumina trihydrate, talc, pyrophyllite, zinc oxide and mixtures thereof, and an acid catalyst cross-linking aid selected from the group consisting of inorganic and organic salts, organic acids, and amine acid-addition salts, said polymer comprising from 2% to 16% by weight, and said filler from 50% to 90% by weight of the total aqueous composition and wherein said composition is a non-hydraulic mortar.

13. A method for setting and grouting tile according to claim 12 wherein said polymer is substantially emulsified in the aqueous composition.

14. A method according to claim 13 wherein said filler is glass.

15. A method according to claim 14 wherein said filler is quartz.

16. A method according to claim 14 wherein said filler is silica.

17. A method according to claim 14 wherein said filler is alumina trihydrate.

18. A method according to claim 14 wherein said filler is a mixture of glass, alumina trihydrate and silica.

19. A method for setting and grouting tile according to claim 12 wherein a water-soluble, water-retentive agent selected from the group consisting of methyl cellulose and hydroxyethyl cellulose is added to the aqueous composition.

20. The method according to claim 12 wherein said catalyst is an acidic catalyst present in an amount to provide from 0.03% to 2.0% by weight of the total composition.

21. The method according to claim 12 wherein an activating agent is included in the mortar composition.

22. The method according to claim 21 wherein said activating agent is formaldehyde.

23. A new article of construction which is resistant to attack by water and/or chemicals produced according to the method of claim 12, said article comprising tiles bonded to a support, said tiles being arranged in edge-to-edge relationship with open spaces between said tiles, the spaces between said tiles comprising the cured mortar composition.

24. A new article of construction as claimed in claim 23 wherein said cured mortar composition is additionally located between said tiles and support.

25. The method for setting and grouting tile according to claim 12 wherein said acid catalyst is an inorganic salt.

26. The method for setting and grouting tile according to claim 12 wherein said acid catalyst is an amine acid-addition salt.

27. The method for setting and grouting tile according to claim 12 wherein said acid catalyst is selected from organic acids and organic salts.

28. A method of grouting tile which comprises:

assembling on a substrate a plurality of ceramic tiles in edge-to-edge relationship with spaces between the tiles; and filling the spaces between the tiles with an aqueous grouting composition having a viscosity in the range of 10,000 to 1,200,000 cps comprising 1. a film-forming, room temperature cross-linkable polymer in the form of an emulsion, suspension, dispersion or partial solution, having reactive substituents on the polymer chain selected from the group consisting of epoxy, hydroxy, methylol, carboxy, ester, α-olefin, isocyanate, methylol acrylamide, amino, N-methylol amide, internal double bond and combinations thereof wherein said reactive substituents are capable of reacting at room temperature to cross-link said polymer, 2. a water-insoluble filler, and 3. an acid catalyst cross-linking aid selected from the group consisting of inorganic and organic salts, organic acid, and amine-acid addition salts, said polymer comprising from 2% to 16% by weight, and said filler from 50% to 90% by weight of the total aqueous composition and wherein said composition is a non-hydraulic mortar.

29. A method of setting ceramic tile which comprises applying to a substrate and/or the backs of ceramic tiles a mortar composition having a viscosity in the range of 10,000 to 1,200,000 cps comprising
1. a film-forming, room temperature cross-linkable polymer in the form of an emulsion, suspension, dispersion or partial solution, having reactive substituents on the polymer chain selected from the group consisting of epoxy, hydroxy, methylol, carboxy, ester, $\alpha$-olefin, isocyanate, methylol acrylamide, amino, N-methylol amide, internal double bond and combinations thereof wherein said reactive substituents are capable of reacting at room temperature to cross-link said polymers,
2. a water-insoluble filler, and
3. an acid catalyst cross-linking aid selected from the group consisting of inorganic and organic salts, organic acid, and amine acid-addition salts, said polymer comprising from 2% to 16% by weight, and said filler from 50% to 90% by weight of the total aqueous composition and wherein said composition is a non-hydraulic mortar; and placing a plurality of said ceramic tiles in an edge-to-edge relationship over said substrate.

\* \* \* \* \*

UNITED STATES PATENT AND TRADEMARK OFFICE
CERTIFICATE OF CORRECTION

PATENT NO. : 3,967,429
DATED : July 6, 1976
INVENTOR(S) : David S. Weiant et al.

It is certified that error appears in the above-identified patent and that said Letters Patent are hereby corrected as shown below:

At Column 2, line 5, "measures" should read --measured--.
At Column 3, line 44, "momomers" should read --monomers--.
At Column 5, line 61, "—C═C—" should read -- —CH═CH— --.
At Column 7, line 15, insert a comma after the word "stabilizers"; line 53, "polymer B*" should read --polymer B**--.
At Column 17, line 47, insert an open parenthesis before the word "reaction".
At Column 20, line 8 (Claim 14), "claim 13" should read --claim 12--.
At Column 20, line 10 (Claim 15), "claim 14" should read --claim 12--.
At Column 20, line 12 (Claim 16), "claim 14" should read --claim 12--.
At Column 20, line 14 (Claim 17), "claim 14" should read --claim 12--.
At Column 20, line 16 (Claim 18), "claim 14" should read --claim 12--.

Signed and Sealed this nineteenth Day of July 1977

[SEAL]

Attest:

RUTH C. MASON
Attesting Officer

C. MARSHALL DANN
Commissioner of Patents and Trademarks